April 28, 1964   O. G. SCHEUERMANN   3,130,476
SCOOP CUTTING AND BOTTOM STOP MACHINES COMBINATION
THE MACHINES AND CONTROL MEANS THEREFOR
Filed June 18, 1958                                6 Sheets-Sheet 4

INVENTOR.
OTTO G. SCHEUERMANN
BY
Bohleber, Fassett, Montstream
ATTORNEYS

United States Patent Office 3,130,476
Patented Apr. 28, 1964

3,130,476
SCOOP CUTTING AND BOTTOM STOP MACHINES COMBINATION THE MACHINES AND CONTROL MEANS THEREFOR
Otto G. Scheuermann, Westfield, N.J., assignor to General Zipper Corporation, Long Island City, N.Y., a corporation of New York
Filed June 18, 1958, Ser. No. 742,787
37 Claims. (Cl. 29—33)

The invention relates to a slide fastener apparatus or combination of a punching or scoop cutting machine and a bottom stop applying machine for slide fasteners. In the manufacture of slide fasteners having two ribbons with scoops, the scoops are applied to an edge of each ribbon in proper spaced relation so that the scoops of one ribbon will interlock or intermesh with the scoops of a like ribbon. The two ribbons with their scoops interlocked or intermeshed together form a slide fastener tape. The scoops carry a slider which intermeshes and releases the scoops of the two ribbons as it slides along the scoops. In order to prevent the slider from passing off of the bottom end of the scoops and to retain the bottom scoops permanently intermeshed, a so-called bottom stop is applied at the end of the scoops or preferably over the last pair or pairs of scoops. The invention relates also to the scoop cutting or punching machine per se and the bottom stop machine per se as well as to the control means for the machines alone and in combination with the tape or chain feeding means and a scoop aligner.

In the final manufacture of slide fasteners, a tape of substantial length with the scoops running continuously for the full length thereof, is passed through a scoop cutting or punching machine which punches out a predetermined number of intermeshing scoops from the tape at spaced intervals leaving gaps in the line of scoops. These gaps may be spaced a predetermined distance apart in order to provide slide fasteners of the desired length or lengths. After the scoops have been punched or cut out simultaneously on both ribbons, a bottom stop is applied, a slider put on, the top stop is applied and the tape or ribbons cut approximately mid-way between the ends of the gap to complete the slide fastener.

It is an object of the invention to construct a slide fastener machine combination which automatically and continuously performs the operations of punching or cutting out the scoops and attaching a bottom stop.

Another object is as above and in addition renders the bottom stop applying machine inoperative in the event the scoop cutting machine becomes jammed or inadequately feeds tape thereto.

Another object of the invention is to construct a punching machine which accurately locates the scoops with respect to the punch so that the scoop at the top stop end of the gap is not damaged by the punch.

A still further object is to construct a punching machine which automatically controls the punching out of the scoops from the tape.

Another object of the invention is to construct a bottom stop applying machine which accurately locates the end of the scoops or the gap for applying a bottom stop thereto.

Another object is to construct a bottom stop machine for applying a bottom stop which can be adjusted to apply the bottom stop either adjacent to the scoop at the gap or over the last scoop or scoops.

A still further object is to construct a bottom stop applying machine which automatically applies the bottom stop to the tape.

Other objects of the invention will be more apparent from the following description when taken in connection with the accompanying drawings illustrating a preferred embodiment thereof in which.

Figure 1:
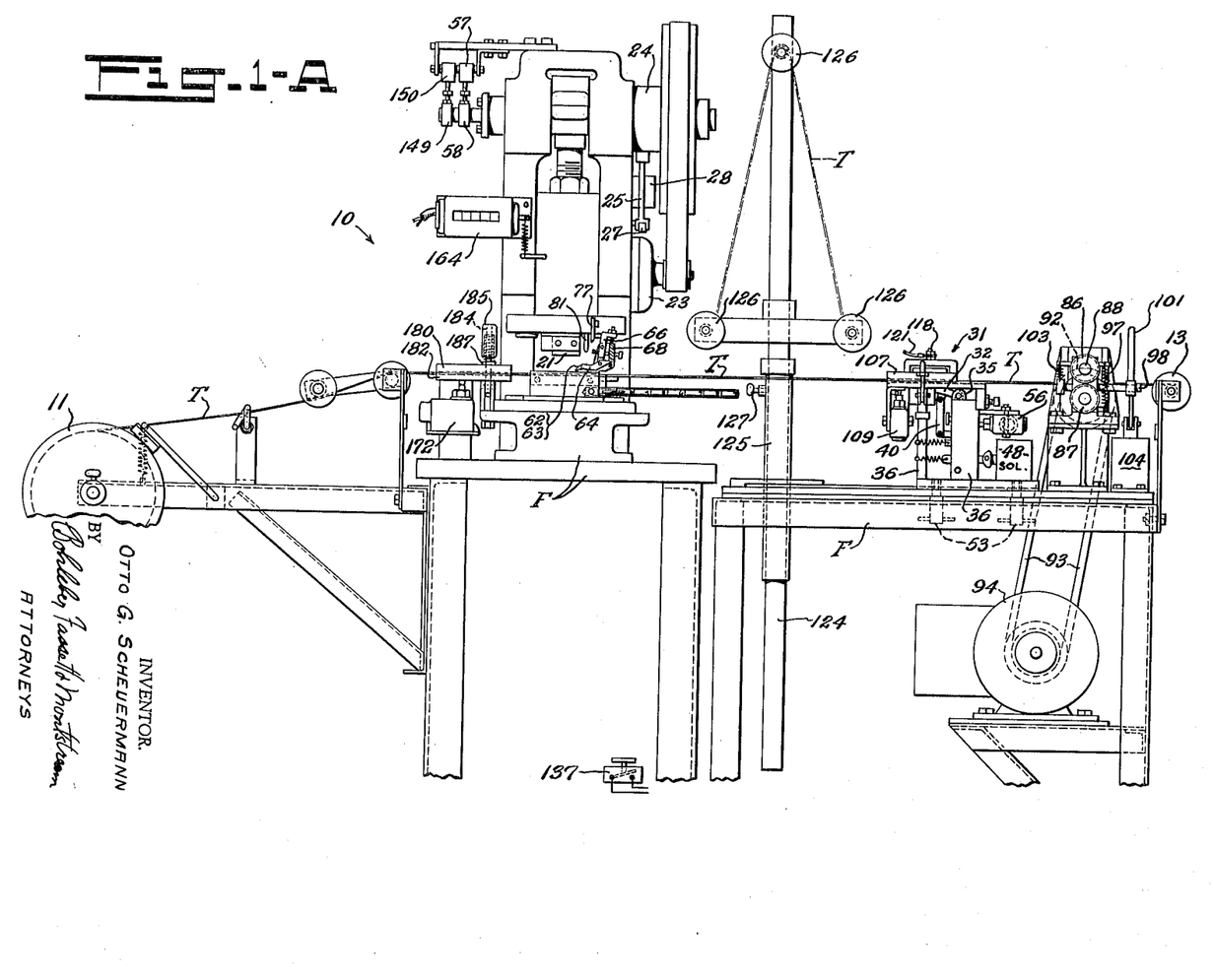
FIG. 1A is a front elevation of a scoop cutting machine for cutting out scoops.
FIG. 1B is a front elevation of a bottom stop machine which receives the slide fastener tape directly from the punching machine.

The slide fastener apparatus or combination comprises the scoop cutting machine and the bottom stop machine in adjacent or in-line relation so that the slide fastener tape T feeds from the scoop punch or scoop cutting machine 10 FIG. 1A directly to the bottom stop machine of FIG. 1B. A long length of the slide fastener tape is carried on the supply spool 11 which tape has a continuous series of intermeshing scoops. This tape may be fed through a tape track 12 on the scoop cutting machine 10 by feed means such as feed rollers and at predetermined intervals, the tape is stopped as will be described. The punch is operated to cut out a predetermined number of the scoops forming a gap in the continuous series or line of intermeshed scoops. The tape with its gap passes over a roll 13 to a roll 14 which is movably mounted such as by being carried on an arm 15 pivoted on a pivot 16. The arm is particularly shown as being mounted on the bottom stop machine although it need not be mounted on this machine. The tape passes over a roll and through a track at the bottom stop machine at which machine the tape is stopped by means to be described so as to apply the bottom stop. The tape then passes through a second tape feeding means such as a set of feed rolls.

If the tape is jammed or does not feed through the scoop cutting machine, the slack in the tape between the two machines reduces, because of continued operation of the feed means for the bottom stop machine, and raises the arm. Raising of the arm closes a switch 17 to operate a relay controlling the relay 130 and thereby stopping the feed by lifting rollers 86 and 87 by means of solenoid 104 of the bottom stop machine. This relay may control both machines if desired. Any type of tape feed means may be used that shown being rollers which are shown as being driven by a separate motor. Although a tape feed means is shown for each machine, the feed means for the bottom stop machine has and will feed the tape through both machines.

The scoop cutting machine is of any known form and includes a punch 21 which cooperates with a die 22 to cut or punch out a series of scoops in the tape. The number of scoops cut or punched out is determined by the length or width of the punch. The track 12 guides the tape over the die. Such scoop cutting machines include a motor 23 which may be connected with the punch such as with a fly wheel. A clutch 24 is provided on the machine to connect the fly wheel with a crankshaft which drives the punch downwardly and upwardly after which the clutch is automatically released or disengaged to stop the punch at the top of its stroke after one cycle in known manner. The clutch is released such as by an operating rod 25. For automatic operation of the clutch, the operating rod is operated by a solenoid 28 through a connecting lever 27.

The bottom stop machine may be any known type of machine which applies a fastener such as a staple. It includes a fastener feeding means which feeds a fastener one at a time underneath the bottom stop machine ram. A motor is connected with the ram through a clutch which when engaged moves the ram downwardly and drives the fastener onto the scoop or scoops or tape and against an anvil which bends the prongs of the fastener and anchors it to the ribbons of the tape or the scoops of both ribbons and secures or locks them together. To operate the machine the clutch is engaged such as by a solenoid and the ram moves downwardly, applies the fastener and returns to retracted or up position where it stops, the clutch being automatically disengaged, ready for the second staple applying operation in known manner.

Control Means

In order to stop the tape in the proper position or at the proper length to punch or cut out a series of scoops, a control means 31 engages in the gap between the adjacent edges of the two ribbons formed where the scoops have been cut out which control means has the double function of stopping the tape and of controlling the operation of the scoop punch. This control means (FIG. 2) includes a finger 31 carried on a finger lever 32, the end of which lever is pivotally mounted upon a pivot 34 carried by a mounting means which mounts the finger lever for longitudinal movement when the finger engages in a scoop gap. The finger projects through a recess 38 in a lower track member 39 which forms a part of a tape track or guide and is carried by a track plate 29 on the top of a frame 36. The mounting means particularly shown is a finger mounting lever 35 pivoted to the frame 36 on a pivot 37 below the level of the finger so that the finger is mounted for longitudinal movement in the direction of the movement of the tape. The mounting lever and finger are normally propelled to the left by a spring 30, the fixed end of which is secured to a pin 52 carried by the control frame 36.

Figures 2, 8:
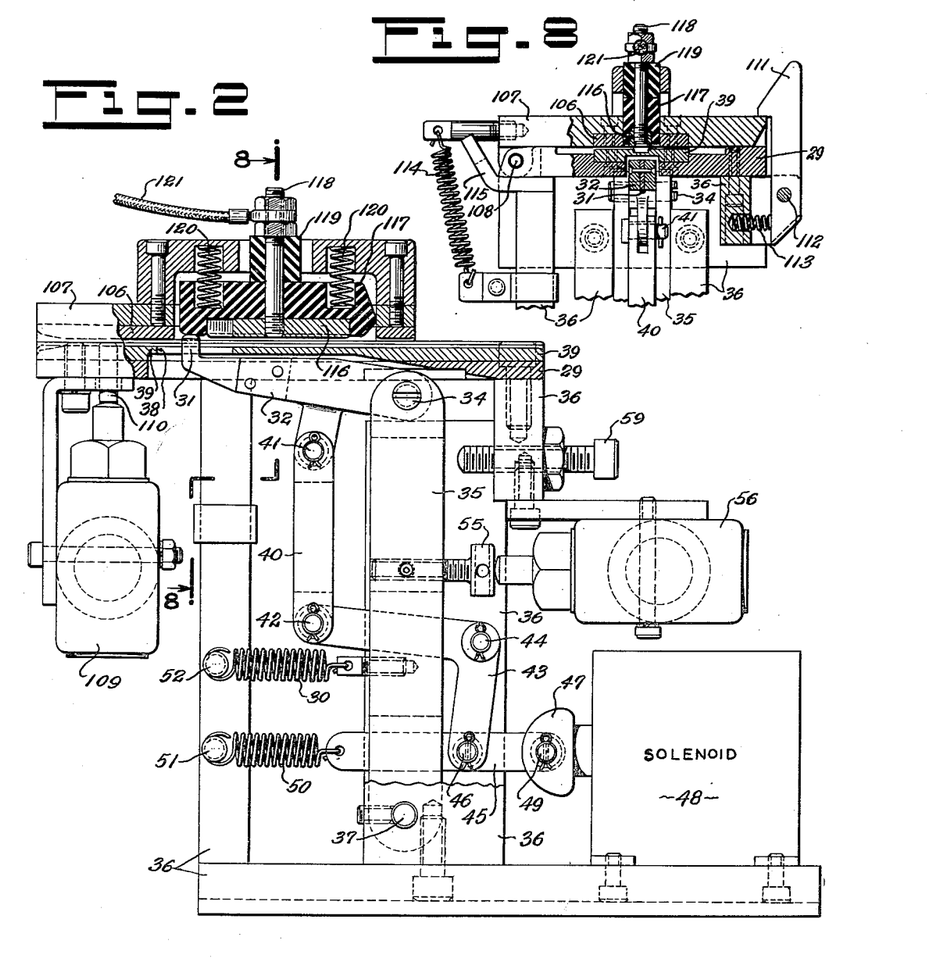
FIG. 2 is a detail view of the tape control means.
FIG. 8 is a side view of the tape control means with parts in section.

A link 40 is pivoted to the finger lever on a pivot 41 between the finger and the finger lever pivot 34 and the other end of the link is pivoted by a pivot 42 to one arm of a bell crank lever 43. This bell crank is pivotally mounted on the frame 36 on a pivot 44. A link 45 is pivoted to the other arm of the bell crank lever by a pivot 46 which link is attached to the armature 47 of a solenoid 48 by a pivot 49. A spring 50, having one end anchored to the frame 36 on a pin 51 and the other end is secured to the armature link, propels the armature to the left and hence propels the bell crank lever in a clockwise direction to propel the finger upwardly against the series of scoops in the tape so that the finger enters or is projected into a scoop gap when it reaches the finger.

When a gap in the series of scoops reaches the finger, the latter is spring propelled into the gap and the first scoop engages the finger and moves it and the finger lever 32 longitudinally to the right and the finger mounting lever 35 to the right. The movement of the lever 35 to the right brings the lever or an adjusting screw 55 thereon into contact with the operating pin of a switch 56 so that this switch is closed. Closing of the finger switch operates the solenoid 28 which controls engagement of the machine clutch and sets the scoop cutting machine into operation for one cycle. Upon completion of one cutting or punching operation or one cycle, a switch 57 operated by the scoop cutting machine is closed by the machine such as by a switch cam 58 mounted on the main shaft of the machine which switch operates the finger withdrawing solenoid 48. Actuation of the solenoid pivots the finger downwardly so that the tape is no longer obstructed by the finger and the tape is again fed until a second gap appears whereupon the operation repeats. A limit stop 59 may be carried by the frame 36 to limit the movement of the lever 35. The entire control means is adjustable with respect to its distance from the punch for different lengths of slide fasteners and clamped in position by clamp screws 53.

Scoop Aligner

Figure 5:
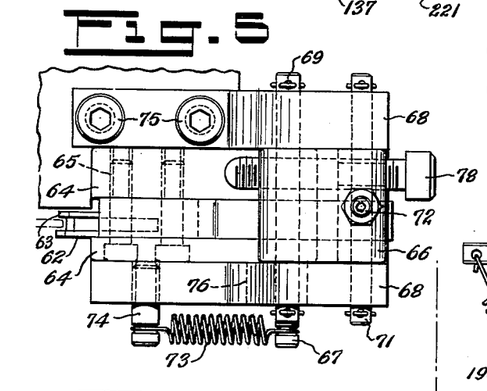
FIG. 5 is a top view of the scoop aligning means.

It is desirable to provide means to align the scoops with the punch so that the latter does not overlap a scoop at the top stop end of the gap and damage the same. This scoop aligning means (FIGS. 3, 5) includes primarily an aligning pawl 62 having a pair of teeth 63 spaced longitudinally to correspond with the spacing of the intermeshed scoops in the two ribbons of the tape and preferably are spaced apart laterally so that the edge portion of the punch 21 may pass therebetween. With the pawl so located, the alignment takes place, therefore, at the edge of the punch. This pawl is mounted on a pawl carrier 64 by screws 65 so that the pawl may be easily replaced. The pawl carrier is pivotally mounted on a swing link 66 by a pivot 67 at the bottom of the link and the link is pivoted to a pawl bracket 68 on a pivot 69. A spring 70 pivots the pawl so that the teeth are normally above contact with the scoops. A stop 71 limits the lift of the pawl. A stop screw 72 carried by the swing link engages the bracket and limits the swing of the latter. A spring 73 having one end attached to the pivot 67 and the other end secured to a screw 74 carried by the bracket propels the pawl to the left in FIG. 3. The end of the pivot 67 projects through an enlarged hole 76 in the bracket. The pawl bracket is secured to the punch base by bolts 75.

The scoop aligning means includes operating means for shifting the pawl to the right as the punch descends and also for pressing the pawl downwardly so that the teeth are partially inserted between scoops. This operating means includes a cam 77 carried by the punch head which engages the end of a bolt 78 carried by the swing link to shift the bolt, the swing link and the pawl to the right as viewed in FIG. 3, just prior to engagement of the punch with the scoops. The bolt is threaded into the swing link for adjustment so that the position of the pawl and hence the position of the scoops may be precisely shifted so that the punch engages between scoops and does not damage a scoop at the top stop end of the scoop gap, cut out of the line of scoops. Upon upward movement of the punch and disengagement of the cam with the bolt, the spring 73 restores the pawl to its initial position for a second punching operation.

Figure 3:
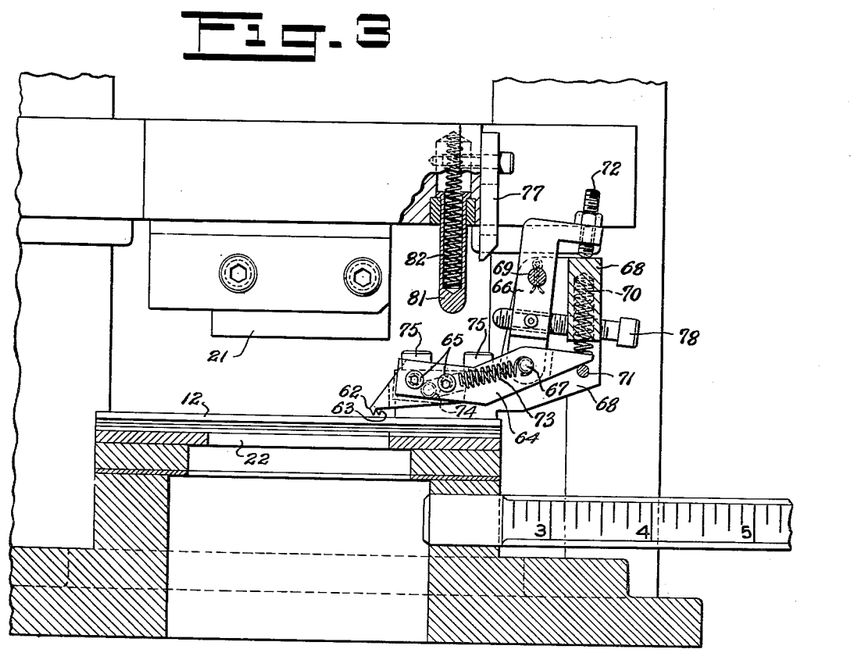
FIG. 3 is a detail view of the scoop aligning means.

The punch or punch head carries a slidable depressor 81 which is pressed downwardly by a spring 82 within the depressor. This depressor is also a part of the scoop aligning means and the operating means for the pawl. The depressor moves downwardly with the punch head and is located so that it engages the pawl or particularly the pawl carrier and resiliently presses the latter and the pawl downwardly whereupon the teeth of the pawl are pressed partially between a pair of scoops to provide shifting contact so that when the pawl is shifted to the right by the cam 77, the scoops are shifted therewith to bring the edges of the end scoops to be cut out into alignment with the edge of the punch. The scoop at the top stop end of each gap will, therefore, not be damaged by the punch.

Feed Means

Figure 4:
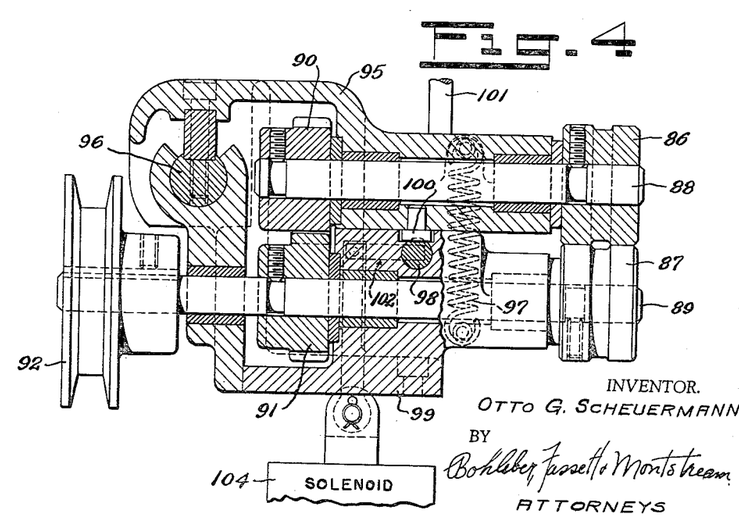
FIG. 4 is a detail view of the tape feeding means.

Feeding means are preferably provided for the tape to feed the tape through the track and under the punch so that the cutting or punching operation is fully automatic. The feeding of the tape through the machine can be performed by manually pulling on the tape. The feeding means may take several forms, that illustrated includes a pair of free rollers 86, 87 engaging opposite sides of the tape and carried upon shafts 88, 89 respectively. One shaft has a gear 90, and the other shaft has a gear 91 which mesh with each other. A pulley 92 drives one of the shafts through a belt 93 connected with a motor 94.

The upper feed roller and shaft is mounted in a pivoted arm 95 carried on a pivot 96. This arm is spring pressed downwardly by a spring 97 so that the upper feed roller is brought resiliently into contact with the tape between the rollers. Suitable means may be provided to separate the upper roller from the bottom feed roller such as by pivoting the arm carrying the upper roller. The means particularly shown for this purpose is a cam 98 turnably mounted in the feed roll bracket 99 which cam engages a button 100 carried by the pivoted arm. The cam particularly shown is merely a flat on a rotatable cam shaft. When the cam or cam shaft is turned such as by a handle 101, the roller arm is pivoted upwardly which carries the upper feed roller therewith away from the tape. Since the drive gears are adjacent the pivot, they remain in mesh when the pivoted arm and its feed roller is raised.

The finger stops the feeding of the tape against the pull of the feed rollers and is a sufficient feed stop for the tape. In some cases the feed rollers may mark the tape if not separated when the tape is stopped by the finger. In such case it may be desirable to separate the feed means. Hence the feed means may be automatically separated or rendered inoperative whenever the tape is stopped by the control means. To accomplish this, a solenoid 104 is connected with the cam or particularly with a lever 102. This solenoid is controlled by the switch 56 of the control means as will be described hereinafter so that when this switch is closed by the finger engaging in a gap in the tape, the solenoid 104 is energized to rotate the separating cam and separate the upper feed roller from the lower feed roller. When the solenoid 48 is operated to withdraw the finger from a gap in the tape the spring 30 propels the lever 35 to the left which opens the finger switch 56 and is a factor in the deenergizing of the solenoid 104 as will be described. A spring 103 restores the cam to initial position with the flat or low point of the cam engaging the button 100 so that the feed roller arm is moved downwardly by the spring 97 to bring the upper feed roller into contact with the tape to again feed tape through the machine.

There are safety means used in connection with or associated with the control means. A track for the tape is provided at the finger including a lower track member 39 and an upper track member 106 carried by a cover 107. The cover is pivotally mounted on a pivot 108 so that it may be opened for insertion, smoothing or removal of a tape from between the upper and the lower track members. In order to prevent the machine from operation when the cover is opened, a switch 109 is provided on the control means frame 36, the contact of which is engaged by a slide pin 110 engaging the cover. When the cover is in down or closed position, this switch is moved to open position which breaks the circuit to the switch. When the cover is opened, the switch is closed and prevents operation as will be described. A latch 111 mounted on a pivot 112 and pressed by a spring 113 retains the cover closed. A spring 114 may be used to hold the cover open against a stop 115.

A scoop detector or sensing means may also be provided and is shown as carried by the control means and includes a circuit including a conducting shoe 116 secured in an insulator block 117 by a screw 118 and collar 119. The shoe has a length less than the length of a proper gap. Springs 120 propel the block and hence the shoe into contacts with the scoops of the tape. A wire 121 is clamped on the screw 118 so that an electric circuit is established through the wire and screw 118, shoe, and any scoop or scoops, to ground through the frame 36. If there is a scoop in contact with the shoe when the tape is stopped by the finger, the circuit is closed through the shoe and its circuit. If scoops are not present under the shoe as it should be, the circuit is broken or open and nothing happens.

For long slide fasteners an extension stand of any suitable form may be provided between the punching machine and the control means. The stand shown includes a vertical rod 124 slidable in a sleeve 125 secured to the frame F. The rod carries a series of three spaced tape rolls 126 over which the tape is run to form a tape loop. The rod and its tape rolls may be raised above operative position as shown when not in use and secured in position by a clamp screw 127.

*Circuit*

Figure 6:
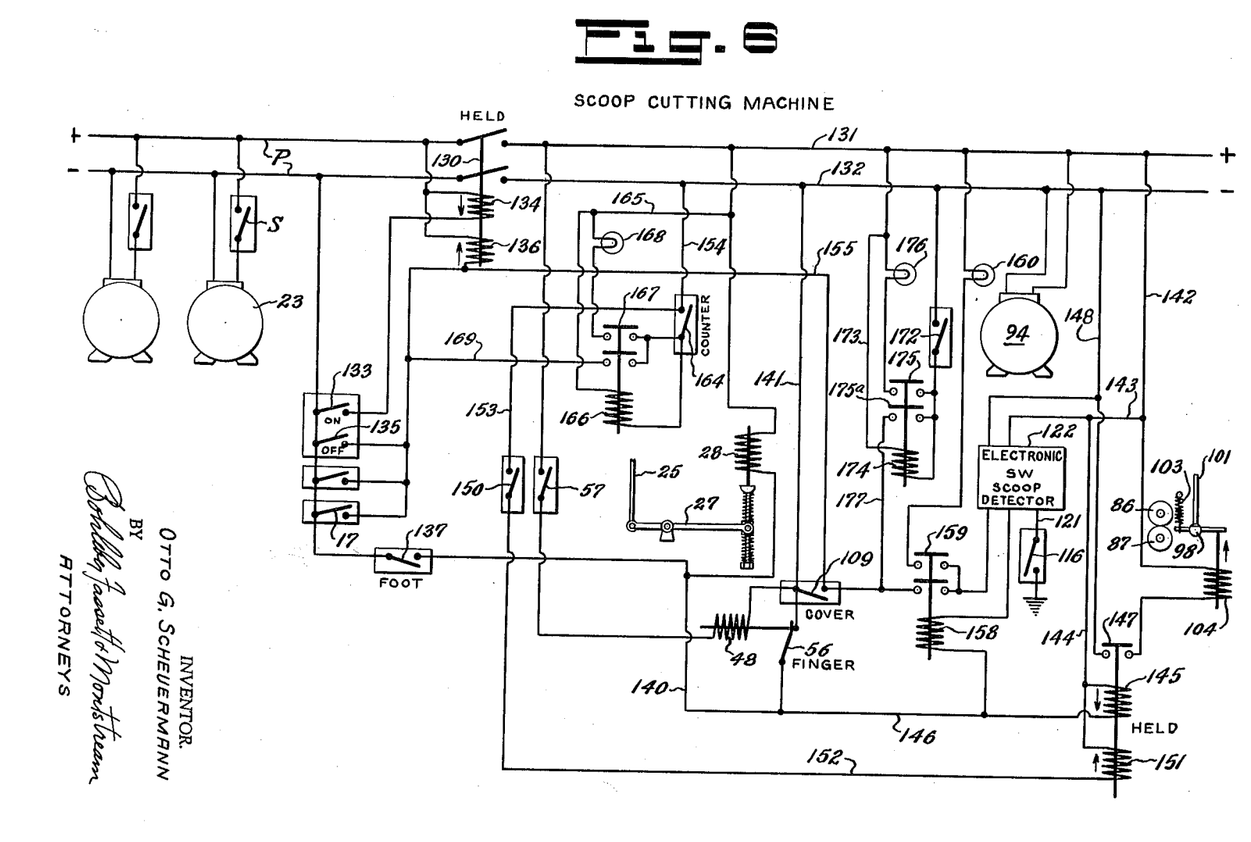
FIG. 6 is a circuit diagram for the scoop cutting machine.

A circuit diagram for the scoop cutting or punching machine is illustrated in FIG. 6. The motor 23 is connected with power lines P through a switch S. In order to connect the various control switches and relays into circuit with the power lines, a main switch 130 is provided which upon closing energizes the power lines 131 and 132. The switch 130 is of the type which is mechanically or electrically held in open and closed position. In order to close the main switch, a manual or push button switch 133 is provided between the power lines momentarily closing of which switch energizes a closing relay winding 134 which closes the switch 130. The switch remains closed until opened such as by momentarily closing the manual or push button switch 135 which energizes the opening relay winding 136 and opens the switch 130 in which position it remains. With the main switch closed, the press may be operated at will by closing of a foot switch 137 which energizes the clutch solenoid 28 to engage the punching machine clutch and operate the punch or punching machine through one cycle of operation in usual punch press fashion.

To operate the scoop cutting or punching machine under the control of the finger and finger switch 56 of the control means, a circuit is provided from the power line 131 through the clutch solenoid 28, wire 140, the finger switch 56, wire 141 to power line 132. Energizing of the solenoid engages the clutch of the scoop cutting or punching machine and it goes through one cycle of operation. When the scoops have been cut or punched out, the switch 57 operated from the cam or screw 58 on the main shaft of the punching machine is closed which establishes a circuit through this switch, solenoid 48 and wire 141 so that this solenoid is energized and withdraws the finger from the gap in the tape. With the finger so withdrawn, the finger is moved to initial or forward position by spring 30 which opens the finger switch 56 and deenergizes the clutch solenoid 28 so that the clutch of the punching machine is released and the machine stops at the end of one cycle as in usual punch press operation.

Closing of the finger switch 56 also sets up a circuit through the wires 142, 143 and 144, through a relay winding 145 and wire 146, then through the switch 56 and wire 141. The relay winding 145 closes a switch 147 which switch is mechanically or electrically held in its open or closed position. Upon closing of the switch 147, a circuit is set up through wire 142, solenoid 104, switch 147 and wire 148 which energizes the solenoid 104 and separates the tape feed roll 86 from its cooperating feed roll 87 as described. When the punching machine has punched out the scoops in the tape a cam or screw 149 such as on the main shaft of the punching machine closes a switch 150 and closes a circuit through wire 142, 143, 144, relay winding 151, wire 152, switch 150, wires 153 and 154 which opens the switch 147 and deenergizes solenoid 104 so that the spring 103 rotates the cam to initial position and spring 97 restores the pivotally mounted feed roller 86 into feeding contact with the tape.

It has been mentioned that in the event that the cover 107 of the control means is open that in that event the switch 109 closes. Closing of this switch sets up a circuit through the relay winding 136 for the main switch, wire 155, switch 109, and wire 141. As long as the cover switch 109 remains closed the opening relay 136 for the main switch remains energized and this switch open and the power wires 131, 132 and the control circuit unenergized.

With the control means, a scoop detector which functions as a switch was described in the shoe 116. If there should be a scoop or scoops under the shoe when the tape stops at the control means, the circuit through the shoe 116 is closed whereupon a circuit is completed through wires 142, 143, the electronic means 122, a relay 158, wire 146, finger switch 56 and wire 141, which closes the double pole switch 159. A circuit is closed thereby including a light 160, switch 159, 122 and wire 148 which causes the light to light up. This also closes a circuit through the main switch opening relay 136, wire 155, switch 159, the electronic means 122 and wire 148 to open the main switch 130. The electronic means 122 is an electronic switch which is purchasable which amplifies the current through the scoop detector 116 and operates a sensitive relay which in turn operates a power relay.

Means are also provided to stop the machine when the desired number of slide fasteners have been made that is after a predetermined number of scoop cutting operations. This is controlled by a counter switch 164 which forms a part of a counter such switch counters being a purchasable item. This switch is set to close when the counter reads a set figure. The counter is operated once for each descent of the punch 121 and is shown particularly connected with the ram for the punch. When the counter switch 164 closes a circuit is set up through wire 165, relay winding 166 and through the counter switch 164. This relay winding closes the double pole switch 167 so that one circuit is closed including a light 168 and a second circuit is closed through the opening relay 136 of the main switch, wire 169 and the switches 167 and 164 to inactivate the machine and circuit.

The ends of two tapes are spliced together and automatic means may be provided to stop the machine that is open the main switch 130 just before a splice which might jam, reaches the punching machine so that it can be hand fed through the machine. If the splice is thin enough it will pass through. This splice detector circuit closes a switch 172 which switch closes a circuit through a wire 173, relay 174 and the switch. Energization of the relay closes a double pole switch 175 which closes a light circuit through the light 176 and switch 172 and also a circuit through the opening relay 136 of the main switch 130, through wires 155 and 177, switches 175 and 172 to open the main switch and render the circuit inactive.

The splice detecting means (FIG. 9), provided just before the tape passes to the scoop cutting machine, includes a cover or lid 180 pivoted on a pivot 181 to a plate 182 carried by a frame or pedestal 191. The cover and plate carry tape tracks 183 between which the tape passes. The cover is resiliently pressed down by spring means which includes a pin 184 secured to the frame or plate 182. The pin carries a cap 185 housing a spring 186 which surrounds the pin and the spring engages a washer 187 which presses against the cover and allows some vertical movement of the cover. A switch 172 mounted on the frame, has a slidable contact pin 189 engaging the bottom of the cover 180 to hold the switch normally open. A spring 190 may be provided to hold the cover open.

Figure 9:
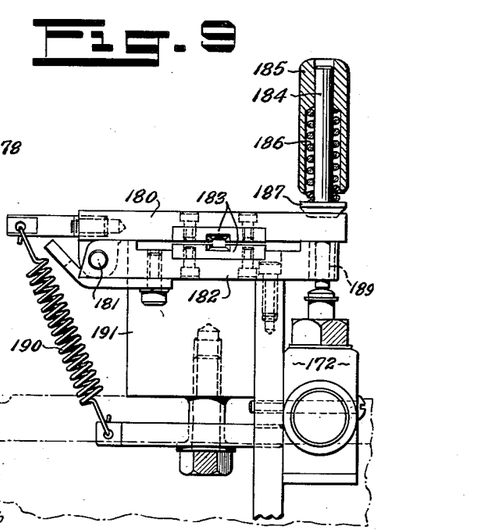
FIG. 9 is a side view of the splice detecting means.

If a splice or other tape defect passes through the splice detector, which may be thick enough to jam the machine, the cover 180 is pressed upwardly against the compression of the spring 186 and this upward movement of the cover closes switch 172 and energizes the relay 174, closes a circuit through the switch 175a and the opening relay or winding 136 for the main switch 130. The control circuit is disconnected from the power lines P upon opening of the main switch and rendered inactive until the condition is corrected by the operator.

*Bottom Stop Machine*

A feed motor 94 is connected across lines 131 and 132 after switch 130. Accordingly, closing of switch 17 causes the feed motor to stop operation.

The second operation in the construction of a slide fastener is the application of a bottom stop which holds the scoops at one end of the slide fastener together against separation. A clip or staple is used for this purpose which is applied by the well known bottom stop or staple applying machine (FIG. 1B). This machine feeds a staple beneath the staple applying head or ram 201 and as it moves downwardly presses the staple over the last one or two scoops or it may be through the ribbons of the tape adjacent to the scoops depending upon the location of the control finger of the control means. The operation of the bottom stop applying machine is controlled by a control means substantially the same as that used on the punching machine and hence the parts thereof are similarly numbered. The control means for stopping the tape is located, or a part thereof is located immediately under the staple applying head of the machine which bends the prongs of the staple as will appear.

The bottom stop applying machine has a motor 196 connected to a clutch 197. The clutch drives a crank 198, a link 199, and a lever 200 which is connected with a ram 201 diagrammatically illustrated. Fasteners or staples are loaded in a supply hopper 202 and feed intermittently into the machine hopper which in turn fills a chute delivering one fastener at a time to a position under the ram so that when the ram descends it drives the staple prongs through the ribbons and bends the prongs. Such fastener feeders are well known and are provided on a bottom stop applying machine. The fastener feed is driven by a motor 203. The machine is usually set into operation by a foot lever 204 (shown without pedal) which is connected by a link 205 to the clutch 197. The staple or bottom stop applying machine with its staple feed mechanism is a known machine. There has been added to the machine a clutch operating solenoid 28b, which is particularly shown as connected with the foot lever so that the machine may be operated by the foot lever at any time that may be desired.

Figure 10:
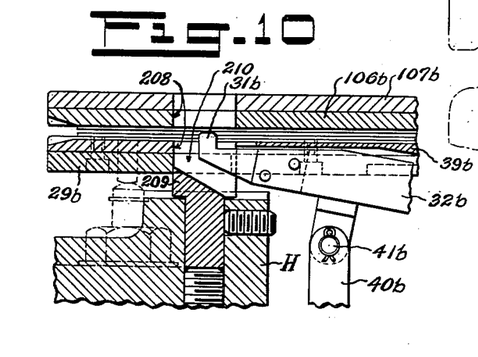
FIG. 10 shows the modification of the control means for its use on the bottom stop machine.

The control means for the bottom stop machine (FIG. 7) differs from that of FIG. 6 for the scoop cutting machine by dispensing with the scoop detector means 116 with its associated parts and by having a hole 208 (FIG. 10) through the cover 107b, tape guides 106b and 39b and track plate 29b to receive the head or fastener anvil 209 mounted upon the anvil horn H of the machine. The anvil has a slot 210 in order to receive the control finger 316 which enters a gap in the tape as previously described. Upon movement of the finger to the right the switch is closed which in turn energizes the solenoid 28b and engages the clutch which sets the bottom stop applying machine into operation for one staple applying operation. By adjusting particularly the stop position of the finger and the closing of the switch 56b by the screw 59 (FIG. 8), the bottom stop may be applied either adjacent to the scoops or over the last one or two scoops. If the finger is adjusted by stop screw 59 so that it stops in its rearward movement underneath the bottom stop applying head then the bottom stop is applied to the ribbons adjacent to the scoop. If on the other hand the edge of the finger is adjusted so that it stops at or adjacent the edge of the anvil then the bottom stop head applies the bottom stop over the last one or two scoops. The bottom stop machine carries a switch 57b on the frame which is engaged by a lug 218 carried on a shaft plate for clutch 197 which rotates one revolution for each operation of the machine. At a timed sequence the switch is closed to energize the solenoid and withdraw the finger from the gap in the slots so that the tape may be fed to a second gap and the process repeated. A similar lug 219 is also carried on the shaft or shaft plate for the clutch which operates a switch 150b, beside switch 57b, which lug closes switch 150b and energizes relay 151b and switch 147b is opened.

Although it has been described that there is a tape feeding means provided for each machine, the two machines will operate with the single feeding means provided for the bottom stop applying machine which may have a more powerful motor. This single feeding means will feed the tape through both machines. Tape feeding mechanism is provided therefore which may be a single feed means or the feed means for both machines.

The circuit (FIG. 7) for the bottom stop machine is basically similar to that for the punching machine and the same circuit elements carry the same numerals with a subscript $b$. This circuit does not include a splice detector or counter switch circuit. A no-fastener switch 213 such as carried by the fastener chute of the machine which switch closes when there are no fasteners in the fastener feed means and upon its closing the opening relay 136$b$ is energized to open the main switch 130$b$. The switch 147$b$ is associated with a switch 214 which is normally closed when feeding means switch 147$b$ is open, and closes a circuit through a syntron feeder 215 when the tape feeding means switch 147$b$ is open. A manually operable auxiliary switch 216 may shunt the switch 214. The bottom stop machine circuit may have a connection 221 between the solenoid 28$b$ and the power line so that the machine may be operated with the foot switch 137$b$ when the main switch 130$b$ is open.

Figure 7:
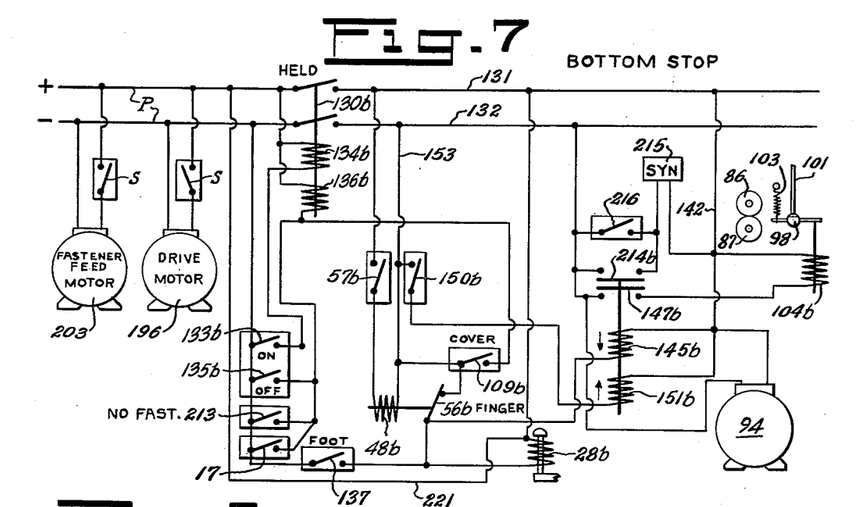
FIG. 7 is a circuit diagram for the bottom stop machine.

The bottom stop machine circuit includes the switch 17 which is controlled by the slack or loop of tape between machines. This switch or a switch for each machine circuit may be included in which case the main switch for both machines is opened. Since feed motor 94 is connected across lines 131 and 132 after main switch 130, the closing of switch 17 causes the feed motor to stop operation. A switch 17 may be provided for the opening solenoid of the main switch for the bottom stop machine circuit solely if desired.

The machine combination disclosed herein uses particularly a counter and a counter switch to render the control means inoperative for the scoop cutting machine when a preset number of punching operations have been performed. The finger enters this last gap in the scoops and holds the tape and stops feeding of tape to the bottom stop machine. Without more notice is given to the operator to stop the bottom stop machine and hence the counter switch cooperates with both machines. More particularly the holding of the tape will reduce the slack of tape between the machines and close the slack or loop switch 17 to open the main switch for the control means for the bottom stop machine and render the latter inoperative or the control means therefor inoperative. The operator may then personally control the applying of a bottom stop to the few lengths between the two machines. In the same manner, the scoop detector particularly located with the scoop cutting machine and the splice detector will operate in the same fashion by each energizing the opening relay 136$b$ for the main switch on the scoop cutting machine so that these elements also have control over the operation of the bottom stop machine or at least give warning to the operator that the bottom stop machine requires personal attention. The counter, splice detector and scoop detector are therefore cooperative elements affecting the operation of both machines.

There are many devices connected with the opening relay 136 for the main switch of the scoop cutting machine to energize this relay some of which include a counterpart device or cooperating means for the opening relay of the main switch of the bottom stop machine. One or more of these devices constitute control mechanism and such devices include the manual switch 135 and 135$b$, the loop measuring means switch 17, the cover switch 109 and 109$b$, the counter switch 164 with its associated means, the spline switch 172 with its associated means, the scoop detector 116 with its associated means and the bottom stop fastener switch 213 for the bottom stop machine. Since the finger switch 56 and 56$b$ is connected with the main switch each of these devices controls the circuit through the finger switch.

The construction particularly illustrated uses an electrical system of switches which control solenoids or relays. A switch is in operative effect an electrical valve and the solenoids or relays are electric motors of a non-rotating type. Their pneumatic counterpart or counterparts are a valve and a non-rotating motor which may be substituted where desired. The double relays 134 and 134$b$, 136 and 136$b$; and 145 and 145$b$, 151 and 151$b$ are double acting electric motors which would be a double-acting pneumatic motor as its equivalent.

This invention is presented to fill a need for improvements in a Scoop Cutting and Bottom Stop Machines combination the Machines and Control Means Therefor. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A machine combination for a slide fastener tape having scoops comprising a scoop cutting machine including a scoop punch, a tape track under the scoop punch, operating means to operate the scoop punch, and control means spaced from the scoop punch and engaging in a gap formed by cut out scoops in the tape to stop the tape and initiate operation of the scoop punch operating means and the scoop punch; a bottom stop machine including means to apply a bottom stop to the tape, a tape track under the bottom stop applying means, operating means to operate the bottom stop machine, and control means located adjacent to the means to apply the bottom stop engaging in a gap formed by the cut out scoops to stop the tape and initiate operation of the operating means for the bottom stop machine; feed means to feed the tape through both machines at the same rate, and control mechanism for both of said control means and operable by any variation in the length of the tape between machines to render the control means inoperable.

2. A machine combination as in claim 1, said combination including an electric power circuit having a main switch, an opening relay connected with the main switch, and in which the control mechanism is operatively connected with the opening relay to stop the machine.

3. A machine combination for a slide fastener tape having scoops comprising a scoop cutting machine including a scoop punch, a tape track under the scoop punch, operating means to operate the scoop punch, and control means spaced from the scoop punch and including a finger engaging in a gap formed by cut out scoops in the tape to stop the tape, means connected with the scoop punch operating means and operated by the finger to initiate operation of the operating means and the scoop punch including a switch, and means operated by the operating means and connected with the finger to withdraw the finger from the gap including a switch; a bottom stop machine including means to apply a bottom stop to the tape, a tape track under the bottom stop applying means, operating means to operate the bottom stop machine, and control means located adjacent the bottom stop applying means including a finger engaging in a gap formed by the cut out scoops to stop the tape, means connected with the operating means for the bottom stop machine and operated by the finger to initiate operation of the operating means including a switch, and means operated by the operating means and connected with the finger to withdraw the finger from the gap including a switch; feed means to feed tape through the machines; an electric power supply including a main switch for each control means, an opening relay connected with each main switch, each of the control means switches being connected with its main switch; and control mechanism for both of said control means operable by any variation of length of the tape between machines connected with each opening relay to open its main switch.

4. A machine combination as in claim 3 in which the control mechanism includes measuring means between the machines to measure the tape slack, and switch means controlled by the measuring means and electrically connected with each opening relay.

5. A machine combination as in claim 4 in which the slack measuring means is a lever mounted on a pivot, means carried by the lever for receiving the tape between machines and spaced from the pivot, and the switch means is operated by the position of the lever.

6. A machine combination as in claim 3 in which each control means includes a cover, means mounting the cover to open the same, and a normally open cover switch which closes when the cover is opened and connected with the opening relay of the main switch.

7. A machine combination as in claim 3 in which the control mechanism comprises a counter operated by the scoop cutting machine operating means, and a switch operated by the counter.

8. A machine combination as in claim 3 in which the control means comprises a scoop detector including a scoop detector switch adjacent to the finger of the control means for the scoop cutting machine.

9. A machine combination as in claim 3 in which the control means for the cutting machine comprises a splice detector forward of the punch including a switch.

10. A machine combination as in claim 3 in which the control means includes a cover, means mounting the cover to open the same, and in which the control mechanism comprises a scoop detector including a scoop detector switch carried by the cover adjacent to the finger of the control means for the scoop cutting machine, and a normally open switch operated to closed position upon opening of the cover.

11. A machine combination as in claim 3 in which the control mechanism comprises a scoop detector adjacent to the finger of the control means for the scoop cutting machine and a splice detector in advance of the punch including a switch.

12. A machine combination as in claim 3 in which the control mechanism comprises a scoop detector adjacent to the finger of the control means for the scoop cutting machine, and a counter operated by the operating means for the scoop cutting machine including a counter switch closed upon a preset number on the counter.

13. A machine combination as in claim 3 in which the control mechanism comprises a scoop detector adjacent to the finger of the control means for the scoop cutting machine, a splice detector in advance of the punch including a switch, and a counter operated by the operating means for the scoop cutting machine including a counter switch closed upon a preset number on the counter.

14. A machine combination as in claim 3 including slack measuring means between the machines and a switch controlled thereby.

15. A machine for performing an operation on a slide fastener tape having a gap in a series of scoops comprising a reciprocating head, operating means to operate the reciprocating head including an operating means solenoid, a track for guiding the tape with respect to the head; and control means to stop the tape and initiate operation of the operating means including a finger, means mounting the finger for contact with the scoops in the tape so as to enter into a gap in the series of scoops and for longitudinal movement in the direction of the tape, a switch operated by movement of the finger mounting means and electrically connected with the operating means solenoid to initiate operation of the machine operating means, and withdrawing means to withdraw the finger from the gap in the tape including a solenoid connected with the finger, and a switch electrically connected with the solenoid and operated by the machine operating means to close the switch.

16. A machine as in claim 15 including a pair of feed rollers to feed the tape through the track, means to rotate the feed rollers, a pivoted arm supporting one of the rollers, means to press the rollers together, arm pivoting means to pivot the arm and its feed roller away from the other feed roller, and a feed solenoid connected with the arm pivoting means and controlled by the finger switch to operate the solenoid and separate the feed rollers.

17. A machine as in claim 16 including a feed solenoid switch having an opening relay and a closing relay, the finger switch being connected with the closing relay, and a switch operated by the machine operating means and connected with the feed switch opening relay.

18. A machine as in claim 15 including a main switch connected with the control means, an opening relay for the main switch, a cover for the control means, means mounting the cover to open the same, and a normally closed cover switch closed upon opening of the cover and connected with the opening relay to open the main switch.

19. A machine for cutting scoops from a slide fastener tape to form a gap in the series of scoops comprising a punch to cut out a series of scoops on the tape, operating means to operate the punch, and a track for guiding the tape under the punch; and control means spaced from the punch to stop the tape and set the machine operating means into operation including finger mechanism having a finger spaced from the punch on the feed outside thereof a distance corresponding with the desired length of slide fastener and means mounting the finger for contact with the scoops in the tape and for movement into a gap in the series of scoops and for longitudinal movement in the direction of the tape, a finger switch operated by the finger mechanism upon longitudinal movement thereof to initiate operation of the operating means for the punch, and withdrawing means to withdraw the finger from the gap in the tape including a finger withdrawing solenoid connected with the finger, and a switch electrically connected with the finger withdrawing solenoid and operated by the punch operating means to close the switch.

20. A machine as in claim 19 including feed means to feed the tape through the machine having a pair of feed rollers, means to rotate the feed rollers, a pivoted arm supporting one of the feed rollers, means to press the pivoted roller against the other feed roller, arm pivoting means to pivot the pivoted arm and its feed roller away from the other feed roller, and a solenoid connected with the arm pivoting means and controlled by closing of the finger switch to operate the solenoid and separate the feed rollers.

21. A machine as in claim 19 including splice detecting means located adjacent to and in advance of the punch and rendering the control means inoperative.

22. A machine as in claim 21 in which the control means includes a main switch, an opening relay connected with the main switch, and in which the splice detecting means includes a normally closed splice switch connected with the opening relay, means operated by a splice to close the switch and energize the opening relay.

23. A machine as in claim 22 including a movable lid, and the splice switch closing upon movement of the lid.

24. A machine as in claim 19 including a scoop detector closely adjacent to and rearwardly of the finger, and mechanism operated by the scoop detector when a scoop is in contact therewith to render the control means inoperative.

25. A machine as in claim 24 in which the means operated by the scoop detector is a main switch to which the control switch is connected, an opening relay connected with the main switch, and in which the scoop detector is a switch, and means operated by the switch and connected with the opening relay to energize the same.

26. A machine as in claim 25 in which the scoop detector switch is an electrically conducting shoe located to engage the scoops and having a length approximately the length of a scoop gap.

27. A machine as in claim 24 including a main switch, an opening relay connected with the main switch, the finger switch being connected with the main switch, and in which the scoop detector is a switch, the mechanism operated by the scoop detector includes a normally open switch connected with the opening relay, and a closing relay for the normally open switch in series with the finger switch and the scoop detector.

28. A machine as in claim 19 including a counter operated by the operating means, a counter switch associated with the counter which closes upon a preset number, a counter relay switch having its relay connected with the counter switch, a main switch, an opening relay connected with the main switch, and the counter relay switch being connected with the main switch opening relay.

29. A machine for cutting scoops from a slide fastener tape to form a gap in the series of scoops comprising a punch to cut out a series of scoops on the tape, operating means to operate the punch, and a track for guiding the tape under the punch; control mechanism including a solenoid connected with the operating means, a main switch, an opening relay connected with the main switch, and control means spaced from the punch to stop the tape and energize the solenoid, including finger mechanism having a finger spaced from the punch on the feed outside thereof a distance corresponding with the desired length of slide fastener and means mounting the finger for contact with the scoops in the tape and for movement into a gap in the series of scoops and for longitudinal movement in the direction of the tape, a finger switch operated by the finger mechanism upon longitudinal movement and connected to the solenoid to energize the same and connected with the main switch; withdrawing means to withdraw the finger from the gap in the tape including a finger solenoid connected with the finger, and a switch operated by the operating means to energize the finger solenoid and connected with the main switch; and mechanism connected with the main switch opening relay to energize the same and open the main switch.

30. A machine as in claim 29 in which the means to energize the main switch opening relay includes a counter operated by the operating means, and a counter switch operated by the counter upon reaching a preset number.

31. A machine as in claim 29 in which the means to energize the main switch opening relay includes a splice detector located in advance of the punch and receiving the tape, a movable lid carried by the splice detector, and means connected with the opening relay to energize the same including a normally open switch connected with the lid and closed upon movement thereof.

32. A machine as in claim 29 in which the means to energize the main switch opening relay includes a track for the control means having an opening cover, and a normally open cover switch operated to closed position upon opening of the cover and connected with the opening relay.

33. A machine as in claim 29 in which the means to energize the main switch opening relay includes a scoop detector means in series with the finger switch including a scoop detector switch closely adjacent to and rearwardly of the finger and having a length corresponding with the scoop gap made by the punch.

34. A machine as in claim 29 including scoop aligning means adjacent to the punch and having a pawl, means mounting the pawl for pivotal movement and longitudinal movement in the direction of the tape guide, and means carried by the punch to move the pawl.

35. A machine as in claim 30 including a splice detector in advance of the punch, the splice detector including a normally open switch operated to closed position by the splice detector and means operated by the closed switch to energize the main switch opening relay; and including a scoop detector adjacent to the finger and means operated by the scoop detector to energize the main switch opening relay.

36. A machine as in claim 35 including an opening cover for the finger mechanism and carrying the scoop detector, a normally open switch operated to closed position upon opening of the cover and connected with the main switch opening relay.

37. A machine as in claim 35 including tape feed means spaced from the control means including a pair of rolls, means movably mounting one roll, means connected with the movable feed roll to render the same inoperative and operative, a solenoid electrically connected with the finger switch to move the movable feed roll, and electrical means including a switch operated by the operating means to de-energize the feed roll solenoid to restore operation of the feed means.

References Cited in the file of this patent

UNITED STATES PATENTS

| | | |
|---|---|---|
| 2,202,843 | Edwards | June 14, 1940 |
| 2,318,132 | Welk | May 4, 1943 |
| 2,370,187 | Pechy | Feb. 27, 1945 |
| 2,410,905 | Slusher | Nov. 12, 1946 |
| 2,445,179 | Maynard | July 13, 1948 |
| 2,562,702 | David et al. | July 31, 1951 |
| 2,605,842 | Horton | Aug. 5, 1952 |
| 2,633,915 | Dahlstrom | Apr. 7, 1953 |
| 2,673,345 | Berg | Mar. 30, 1954 |
| 2,754,908 | Proud | July 17, 1956 |
| 2,846,006 | Feitl | Aug. 5, 1958 |
| 2,852,777 | Cohn | Sept. 23, 1958 |
| 3,003,306 | Quisenberry | Oct. 10, 1961 |
| 3,079,825 | Biben | Mar. 5, 1963 |